(12) United States Patent
Ling et al.

(10) Patent No.: US 6,455,091 B1
(45) Date of Patent: Sep. 24, 2002

(54) TIME SAVING METHOD FOR PREPARING TAPIOCA STARCH BALLS AND THE PRODUCT THEREOF

(76) Inventors: Patrick Po-Yung Ling, 29047 Wagon Rd., Aguora Hills, CA (US) 91301; Janie Huoy-Jen Lai, 29047 Wagon Rd., Aguora Hills, CA (US) 91301

( * ) Notice: Subject to any disclaimer, the term of this patent is extended or adjusted under 35 U.S.C. 154(b) by 70 days.

(21) Appl. No.: 09/799,992

(22) Filed: Mar. 7, 2001

(51) Int. Cl.[7] .......................... A23L 1/0522; A23L 2/38; A23F 3/14
(52) U.S. Cl. ................. 426/578; 426/590; 426/597; 426/508; 426/509; 426/529; 127/34
(58) Field of Search ............................ 426/578, 590, 426/597, 508, 509, 529; 127/34

(56) References Cited

U.S. PATENT DOCUMENTS

| | | | | |
|---|---|---|---|---|
| 4,025,657 A | * | 5/1977 | Cheng et al. | 426/579 |
| 4,192,900 A | * | 3/1980 | Cheng | 426/579 |
| 2001/0002269 A1 | * | 5/2001 | Zhao | 426/112 |

OTHER PUBLICATIONS

L.A. Times Business Section "Tea with Gummy Balls" Jan. 6, 2001.

* cited by examiner

*Primary Examiner*—Nina Bhat
(74) *Attorney, Agent, or Firm*—Chan Law Group LC

(57) ABSTRACT

The present invention satisfies the long felt need in the beverage industry of a method of preparing tapioca starch balls that moves the time consuming, equipment demanding, and labor intensive process of precooking the dried tapioca starch balls to the tapioca starch ball manufacturer. The manufacturer precooks, freezes and conveniently packages the tapioca starch balls. The tapioca starch ball manufacturer will employ and train the personnel needed to precook the balls and not a retailer or a consumer. A retailer or a consumer will quickly and easily thaw or cook the conveniently sized preprocessed frozen packages of tapioca starch balls in a conventional microwave oven to prepare the balls for immediate use in Boba drinks. A retailer or a consumer can quickly react to sudden changes in demand for the balls by using the conveniently sized prepackaged frozen tapioca starch balls and thus reduce wasteful over production.

77 Claims, No Drawings

US 6,455,091 B1

TIME SAVING METHOD FOR PREPARING TAPIOCA STARCH BALLS AND THE PRODUCT THEREOF

FIELD OF INVENTION

The present invention relates to a method for preparing tapioca starch balls that greatly reduces the time and effort required by a retailer or a consumer to prepare them for addition into Boba drinks and the product of this method. More particularly, the present invention relates to a method for the manufacturer to precook, freeze and prepackage tapioca starch balls for transport for consumer purchase from a supermarket or to a Boba drink retailer who would quickly and easily thaw and cook them for inclusion into Boba drinks using a conventional a microwave oven. The invention also includes the product of the freezing process and product of the easy thawing process.

BACKGROUND OF THE INVENTION

Brightly colored sweet tea drinks called "Boba", or "Bubble", or "Pearl Milk" have gained in popularity recently. Tapioca starch balls, also known as "Pearl Balls", are roughly one centimeter in diameter. To make Boba drinks, simply add some prepared Pearl Balls to milk, tea, coffee, fruit juice, coconut milk, hot chocolate, etc. The drink can be served either hot or cold, and is drunk using a large diameter straw. The drink's unusual nature is increased by the combination of the exotic drink sipped through the large diameter straw and the gummy tapioca balls that can also be cleanly extracted from the bottom of the drink and eaten with the drink by sucking them up through the straw.

The Pearl Balls have an attractive pearl-like appearance and come in a variety of colors as well as the more common black. The color of the Pearl Balls can even be mixed and matched with the color of the drink to add to the drinking experience. The Pearl Balls prepared by the method of the instant invention are vitamin and mineral enriched and are all natural and remain fresh without added preservatives or artificial colors. They have a unique, chewy and gummy texture. They can be included in either hot or cold drinks.

Boba drinks have been very popular in Asia for years. The popularity of Boba drinks has recently expanded beyond the Asian-American community and is beginning to enter American mainstream pop culture. A small group of entrepreneurs have fueled the mainstreaming of these drinks into American culture through trendy tea bars popping up around colleges and other stylish places around the country. While the consumption of coffee has declined 20% over the past five years, tea consumption has increased 3%. The tea bar entrepreneurs are hoping that Boba drinks will continue this trend.

The tapioca starch balls are made from starch. Starch is generally a mixture of two structurally different polysaccharides. One component termed, amylose, is a linear molecule composed of 250 to 300 d-glucopyranose units uniformly linked by a-1,4 glucosidic bonds which tend to cause the molecule to assume a helix like shape. The second component, amylopectin, consists of 1000 or more glucose units of which most are also connected with a- 1,4 linkages, but there are also a number of a-1,6 links occurring at branch points. These links amount to about 4 per cent of the total linkages or one for approximately every 25 glucose units. The tapioca Starch is made of cassava roots contains approximately 17% amylose and 83% amylopectin.

When a starch-thickened mixture is stirred as it cools, its viscosity normally increases. Through a cooking and cooling process, there is a tendency for intermolecular bonds with free water and bound water to form a gel.

Retrogradation can be regarded as a normal progression in the firming of a starch gel. The rate and extent of retrogradation are influenced by temperature, size, shape, and concentration of the starch molecules and by other ingredients. It appears to occur most rapidly at temperature near 0 degrees Celsius.

To retard retrogradation of the gel to the least possible level, a freezing system including a liquid nitrogen spray method is employed to bring the tapioca ball temperature quickly down to penetrate the 0 degrees Celsius zone and continue lowering the temperature to between −20 and −25 degrees Celsius within a short period of time. This process allows the free water in the starch granule to form fine ice crystals that help the starch to withhold its normal characteristics until the product is thawed. If a more conventional tapioca ball freezing process is employed, upon thawing the tapioca starch balls will not have its juicy and gummy texture.

Thawing frozen tapioca starch balls with a microwave oven is not only a faster way to thaw the balls than the conventional method, but using a microwave oven allows the Boba drink maker to thaw the tapioca starch balls just before she plans to serve them thus maintaining the highest juiciness and quality and avoiding over drying through the dripping phenomenon.

The effect of immersing the whole block of frozen precooked tapioca balls into a predetermined amount of hot water is that through heat conduction the first part of the frozen precooked tapioca starch ball that thaws is the free water crystal. This makes the frozen precooked tapioca ball becomes porous and greatly increases the speed of the microwave oven thawing process. The thawing speed of frozen food using a microwave oven depends on the density of the frozen food. When the free water crystal inside of each frozen precooked tapioca balls thaws, the density of each pearl ball decreases and the thawing speed is increased. The submersion of the block into hot water during the thawing process ensures even heating of each ball and avoids a situation where part of the block of frozen precooked tapioca balls is scorched and another part of the same block is still frozen.

The size and shape of the frozen food greatly affects the speed of the thawing process. It is possible to freeze the tapioca starch balls into an optimal shape. This shape is optimal because it will facilitate rapid and even microwave oven thawing. For instance, an optimally shaped block of frozen precooked tapioca balls can be a 15.5 cm×11.5 cm×2.0 cm. Each such block weighs 300 grams. Each such block contains enough tapioca starch balls for the production of eight Boba drinks.

Until now the only method to prepare the tapioca starch balls was to submerge dried tapioca starch balls in boiling water in a covered pot for twenty minutes over a medium level flame on a stove top. Next turn off the flame. Stir the mixture. Re-cover the pot. Let it sit for thirty-five minutes. Use a net strainer to drain off the hot water. Rinse and cool the balls using tap water. Transfer the balls to a dry container. Gently mix the balls with some amount of white sugar until an even coating is achieved. The total preparation time is about an hour. Then, store at room temperature and serve within 6 hours.

The conventional method of preparation poses special problems for the retailer. The conventional method of preparation requires a stove and other equipment not usually found in a tea or beverage bar or a coffee house. The preparation equipment used in the conventional method requires a lot of space that the entrepreneur desperately needs to use efficiently to remain competitive. Another disadvantage of the conventional method is that the prepared starch balls must be used within six hours. After six hours the starch balls take on an undesirable consistency. The difficult preparation method forces the entrepreneur to face the difficult alternatives of possibly running out of tapioca balls due to high demand or preparing too many tapioca balls and not being able to sell the entire amount within six hours. The conventional method of preparing the tapioca balls also require the workers to possess a certain minimum skill level that demands training and leads to higher worker compensation costs. These difficulties make selling the Boba tea a risky business proposition.

The conventional method of preparation poses special problems for the consumer. The conventional method of preparation requires a stove and other equipment that the typical consumer uses infrequently. Another disadvantage of the conventional method is that the prepared starch balls must be used within six hours. After six hours the starch balls take on an undesirable consistency. The difficult preparation method forces the consumer to face the difficult alternatives of possibly running out of tapioca balls due to high demand, or preparing too many tapioca balls and not being able to use the entire amount within six hours, or drinking the beverage without the pearl balls. A typical consumer does not have the requisite training and skill level needed with the conventional method and may not have the desire or time to acquire it. These difficulties reduce the sales of pearl balls to the consumer.

What is needed in the industry is a method of preparing the tapioca starch balls that moves the time consuming, equipment demanding, and labor intensive process of cooking the dried tapioca starch balls to the tapioca starch ball manufacturer and moves to a retailer or a consumer an easily repeatable time saving microwave oven thawing/cooking process of preparing the preprocessed tapioca starch balls. This change will reduce the investments in time and equipment thus reducing the cost of production for the retailer or the consumer.

An objective of this invention is to provided a simple and time saving method of preparing tapioca starch balls that employs a microwave and other devices typically found in a home, tea bar or coffee house. Another objective is to remove the cooking process from the retail Boba drink seller and place it with the tapioca starch ball manufacturer. Still another objective is to reduce the equipment needed to prepare the tapioca starch balls and also free the Boba drink retailer from having to provide the space for this specialized equipment in her shop. Yet another objective is to provide a low cost, easy and time saving method for a consumer to prepare pearl balls for Boba drinks. A further objective of the invention is to create a method of preparation that is easy for an unskilled worker to perform and still create tasty and gummy tapioca starch balls. Yet another objective of the instant invention is to provide an easily repeatable and low cost preparation method that makes it possible to produce enough tapioca starch balls to satisfy retail demand and reduce possible losses due to over production. Another objective of the present invention is to have a method of preparing the tapioca starch balls that allows them to be vitamin and mineral enriched and manufactured without preservatives. Yet another objective of the present invention is to develop a method to produce a conveniently sized, prepackaged frozen tapioca starch balls that makes it possible for a retailer or a consumer to prepare a low volume of pearl balls. This would make it feasible for a retailer or a consumer to stock tapioca starch balls in many different colors.

SUMMARY OF THE INVENTION

The present invention resides in a method of preparing the edible starch balls for inclusion in drinks or food. The method of preparing the edible starch balls for inclusion in drinks or food includes the following steps: Precooking the dry starch balls. Freezing the precooked starch balls. Thawing, cooking and preparing the frozen precooked starch balls for consumption.

The details of the method of precooking the dry starch balls include the following steps: Filling a container with hot water. Submerging the dry starch balls into water at a first predetermined temperature held in the container. Stirring the submerged dry starch balls to avoid clumping and sticking. Covering the container with a lid. Cooking the starch balls for a first predetermined span of time. Stopping the heating process. Uncovering the container. Stirring the mixture. Re-covering the container. Letting the mixture sit in the covered container for a second predetermined span of time without adding any heat. Draining off the hot water by pouring the mixture through a net strainer. Rinsing and cooling the starch balls held by the net strainer with tap water. Transporting the precooked starch balls to the freezing device.

The first predetermined temperature is 100 degrees Celsius.

The details of the method for freezing the precooked starch balls include the following steps: Pre-cooling the precooked starch balls to a second predetermined temperature. Placing the pre-cooled, precooked starch balls in a cryogenic safe container or one that would not be damaged by exposure to the very cold temperatures used in the process. Placing the cryogenic safe container onto a cryogenic safe conveyor belt running through a tunnel in the freezer device. Spraying cooling agent at a third predetermined temperature into the tunnel and around the cryogenic safe container to lower the air temperature in the tunnel to a fourth predetermined temperature. Conveying the container through the tunnel for a third predetermined span of time resulting in lowering the core temperature of each starch ball to at least a fifth predetermined temperature. Removing the container from the cryogenic safe conveyor. Packaging the frozen starch balls for shipment in a manner that maintains a core temperature of the starch balls of at least a sixth predetermined temperature. Transporting the packaged starch balls by a method that maintains a core temperature of the starch balls of at least a sixth predetermined temperature.

The details of the method for thawing, cooking and preparing the frozen precooked starch balls for consumption include the following steps: Placing the frozen precooked starch balls in a suitable microwave safe container. Submerging all of the frozen precooked starch balls into water at a seventh predetermined temperature held in the microwave safe container. Cooking the mixture in a microwave oven for a fourth predetermined span of time. Removing the microwave safe container from the microwave oven. Stirring the mixture. Covering the mixture in the suitable microwave safe container with a lid. Letting the mixture sit in the covered suitable microwave safe container for a fifth predetermined span of time. Draining off the water by pouring the mixture through a net strainer. Rinsing and cooling the starch balls held by the net strainer with tap water. Transferring the starch balls to a dry container. Coating the starch balls evenly with sugar to avoid clumping by gently mixing said tapioca starch balls with a predetermined quantity of sugar. Storing the starch balls at room temperature. Serving the starch balls within a sixth predetermined span of time after cooking.

The method of preparation detailed above can be used to prepare taro starch balls, sweet potato starch balls and sticky rice starch balls.

The seventh predetermined temperature is at least 80 degrees Celsius.

DETAILED DESCRIPTION OF THE INVENTION

The present invention resides in a method of preparing the tapioca starch balls for inclusion in drinks or food. The method of preparing the tapioca starch balls for inclusion in drinks or food includes the following steps: Precooking the dry tapioca starch balls. Freezing the precooked tapioca starch balls. Thawing, cooking and preparing the frozen precooked tapioca starch balls for consumption.

The details of the method of precooking the dry tapioca starch balls include the following steps: Filling a container with a first predetermined amount of water at a first predetermined temperature. Submerging the dry tapioca starch balls into the water in the container. Stirring the submerged dry tapioca starch balls to avoid clumping and sticking. Covering the container. Cooking the tapioca starch balls for a first predetermined span of time. Stopping the heating process. Uncovering the container. Stirring the mixture. Re-covering the container. Letting the mixture sit in the covered container for a second predetermined span of time without adding any heat. Draining off the hot water by pouring the mixture through a net strainer. Rinsing and cooling the tapioca starch balls held by the net strainer with tap water. Transporting the precooked tapioca starch balls to the freezing device.

In yet another variation of the invention, the first predetermined temperature of the water in the container is 100 degrees Celsius.

In a still further variation of the invention, the first predetermined span of time is twenty minutes.

In yet a further variation of the invention, the second predetermined span of time is thirty-five minutes.

The details of the method for freezing the precooked tapioca starch balls include the following steps: Pre-cooling the precooked tapioca starch balls to a second predetermined temperature. Placing the pre-cooled precooked tapioca starch balls in a cryogenic safe container. Placing the cryogenic safe container onto a cryogenic safe conveyor belt running through a tunnel in the freezer device. Spraying a cooling agent at a third predetermined temperature into the tunnel and around the cryogenic safe container to lower the air temperature in the tunnel to a fourth predetermined temperature. Conveying the container through the tunnel for a third predetermined span of time resulting in lowering the core temperature of the tapioca starch balls to at least a fifth predetermined temperature. Removing the container from the cryogenic safe conveyor. Packaging the frozen tapioca starch balls for shipment in a manner that maintains a core temperature of at least a sixth predetermined temperature. Transporting the packaged tapioca starch balls by a method that maintains a core temperature of at least a sixth predetermined temperature.

In another further version of the invention, the precooked tapioca starch balls are pre-cooled down to a temperature between 5 to 8 degrees Celsius.

In still another further version of the invention, the precooked tapioca starch balls are pre-cooled by chilled water.

In yet another further version of the invention, the cryogenic safe container is fabricated from aluminum or stainless steel.

In a different version of the invention, the cryogenic safe container is shaped to produce an optimally shaped frozen block of precooked tapioca starch balls. An optimal shape for the frozen block of precooked tapioca starch balls is one that will facilitate rapid and even microwave oven thawing and cooking.

In another different version of the invention, the third predetermined temperature is −196 degrees Celsius.

In another still different version of the invention, the fourth predetermined temperature is between −40 and −60 degrees Celsius.

In yet another different version of the invention, the third predetermined span of time for conveying the container through the tunnel is 7 to 15 minutes.

In an adaptation of the invention, the fifth predetermined temperature is between −20 and −25 degrees Celsius.

In another adaptation of the invention, the sixth predetermined temperature is at or below −8 degrees Celsius.

The details of the method for thawing, cooking and preparing the frozen precooked tapioca starch balls for consumption include the following steps: Placing the frozen precooked said starch balls in a suitable microwave safe container. Submerging all of the frozen precooked tapioca starch balls into a predetermined amount of water at a seventh predetermined temperature held in a microwave safe container. Cooking the mixture in a microwave oven for a fourth predetermined span of time. Removing the microwave safe container from the microwave oven. Stirring the mixture. Covering the mixture in a suitable microwave safe container with a lid. Letting the mixture sit in the covered suitable microwave safe container for a fifth predetermined span of time. Draining off the hot water by pouring the mixture through a net strainer. Rinsing and cooling the tapioca starch balls held by the net strainer with tap water. Transferring the tapioca starch balls to a dry container. Coating the tapioca starch balls evenly with sugar to avoid clumping by gently mixing the tapioca starch balls with a predetermined quantity of sugar. Storing the tapioca starch balls at room temperature. Serving the tapioca starch balls within a sixth predetermined span of time after cooking.

In a further variation on the invention, the quantity of frozen precooked tapioca starch balls used is 300 grams.

In another further variation on the invention, the quantity of the predetermined amount of very hot water is 600 ml.

In still another further variation on the invention, the seventh predetermined temperature is at least 80 degrees Celsius.

In yet another further variation on the invention, the mixture is cooked at 100% microwave oven power in a microwave oven with at least 700 watts of microwave cooking power.

In another yet further variation on the invention, the microwave oven has a rotating turntable.

In another still further variation on the invention, the first predetermined span of time is four minutes.

In a different variation on the invention, the second predetermined span of time is six minutes.

In another different variation on the invention, the sugar is white sugar.

In still another different variation on the invention, the sugar is brown sugar.

In yet another different variation on the invention, the sugar is powdered sugar.

In another still different variation on the invention, the sugar is liquid sugar.

In another yet different variation on the invention, the third predetermined span of time is six hours.

The tapioca starch ball manufacturer will spend the 60 minutes to precook the balls and not a retailer or a consumer when the cooking process is shifted to the manufacturer as it is in the present invention, The tapioca starch ball manufacturer will employ the equipment used to boil the balls and not a retailer or a consumer. The tapioca starch ball manufacturer will employ and train the personnel needed to precook the balls and not a retailer or a consumer. A retailer or a consumer will quickly and easily thaw/cook the conveniently sized preprocessed frozen packages of tapioca starch balls in a conventional microwave oven to prepare the balls for immediate use in Boba drinks. A retailer or a consumer will quickly react to sudden changes in demand for the balls by using the conveniently sized prepackaged frozen tapioca starch balls and thus reduce wasteful over production.

Another version of the method for thawing, cooking and preparing the frozen precooked tapioca starch balls for consumption replaces cookjg the mixture for a fourth predetermined span of time, stirring the mixture and then covering it and letting it sit for a fifth predetermined span of time with cooking the mixture for a new time span, stirring the mixture and then cooking the mixture for another time span. Each time is about two minutes.

In yet another variation of the method for thawing, cooking and preparing the frozen precooked tapioca starch balls for consumption the cooking can be performed on a convitional stove-top.

The invention meets the objective to provide a simple and time saving method for a retailer or a consumer to prepare tasty and gummy tapioca starch balls that employs devices typically found in a tea bar or coffee house or the home. The preparation time span for a retailer or a consumer is reduced from about one hour to about ten minutes. Microwave ovens are a simple and clean method of preparing foods and would typically be found in a tea or juice bar or a coffee house. Another objective the invention satisfies is providing a method of preparation that is easy for an unskilled worker to perform. The instant invention also satisfies the objective of providing an easily repeatable and low cost preparation method that makes it possible to produce enough tapioca starch balls to satisfy retail demand and reduce possible losses due to over production. The present invention also satisfies the objective to use a method preparing the tapioca starch balls that allow them to be vitamin and mineral enriched and manufactured without preservatives. The conveniently sized prepackaged frozen tapioca starch balls also satisfies the objective of providing a means for low volume production which makes it feasible for a retailer or a consumer to stock tapioca starch balls in many different colors.

What is claimed is:

1. A method of preparing edible starch balls for inclusion in drinks or food, comprising the steps of:
   precooking the dry starch balls;
   freezing said precooked starch balls;
   thawing, cooking and preparing said frozen precooked said starch balls for inclusion in said drinks on food.

2. The method of claim 1, wherein the method for precooking of dry said starch balls comprising the further steps of:
   submerging dry starch balls into water held in a container;
   cooking said starch balls for a span of time;
   letting said mixture sit in said container for a span of time without adding any heat;
   draining off said water; and
   rinsing and cooling said starch balls.

3. The method of claim 2, wherein the method for precooking of dry said starch balls comprising the further steps of:
   filling a container with a first predetermined amount of water at a first predetermined temperature;
   submerging dry said starch balls into said water in said container;
   stirring the submerged dry said starch balls to avoid clumping and sticking;
   covering said container;
   cooking said starch balls for a first predetermined span of time;
   stopping said heating process;
   uncovering said container;
   stirring the mixture;
   re-covering said container;
   letting said mixture sit in the covered said container for a second predetermined span of time without adding any heat;
   draining off said water by pouring said mixture through a net strainer;
   rinsing and cooling said starch balls held by said net strainer with tap water; and
   transporting the precooked said starch balls to the freezing device.

4. The method of claim 3, wherein said first predetermined temperature being at 100 degrees Celsius.

5. The product of the method of claim 4 wherein said starch balls being taro starch balls.

6. The product of the method of claim 4 wherein said starch balls being sweet potato starch balls.

7. The product of the method of claim 4 wherein said starch balls being sticky rice starch balls.

8. The method of claim 1, wherein the method for freezing the precooked said starch balls comprising the further steps of:
   pre-cooling the precooked said starch balls;
   freezing said starch balls; and
   packaging the frozen said starch balls for shipment in a manner that maintains said starch balls in a frozen state.

9. The method of claim 8, wherein the method for freezing the precooked said starch balls comprising the further steps of:
   pre-cooling the precooked said starch balls to a second predetermined temperature;
   placing the pre-cooled precooked said starch balls into a cryogenic safe container;
   placing said cryogenic safe container onto a cryogenic safe conveyor belt running through a tunnel in the freezer device;
   spraying a cooling agent at a third predetermined temperature into said tunnel and around said cryogenic safe container to lower the air temperature in said tunnel to a fourth predetermined temperature;

conveying said container through said tunnel for a third predetermined span of time resulting in lowering the core temperature of said starch balls to at least a fifth predetermined temperature;

removing said container from said cryogenic safe conveyor;

packaging the frozen said starch balls for shipment in a manner that maintains a core temperature of said starch balls of at least a sixth predetermined temperature; and transporting the packaged said starch balls by a method that maintains a core temperature of said starch balls of at least a sixth predetermined temperature.

10. The product of the method of claim 9 wherein said starch balls being taro starch balls.

11. The product of the method of claim 9 wherein said starch balls being sweet potato starch balls.

12. The product of the method of claim 9 wherein said starch balls being sticky rice starch balls.

13. The method of claim 1, wherein the method for thawing, cooking and preparing the frozen precooked said starch balls for consumption comprising the further steps of:

placing the frozen precooked said starch balls in a suitable microwave safe container;

submerging in water the frozen precooked said starch balls;

cooking the mixture for a span of time;

letting said mixture sit for a span of time; and draining off said water.

14. The method of claim 13, wherein the method for thawing, cooking and preparing the frozen precooked said starch balls for consumption comprising the further steps of:

placing the frozen precooked said starch balls in a suitable microwave safe container;

submerging the frozen precooked said starch balls into a second predetermined amount of water held at a seventh predetermined temperature;

cooking the mixture in a microwave oven for a fourth predetermined span of time;

removing said microwave safe container from said microwave oven;

stirring said mixture;

covering said mixture in said suitable microwave safe container with a lid;

letting said mixture sit in the covered said suitable microwave safe container for a fifth predetermined span of time;

draining off said water by pouring said mixture through a net strainer;

rinsing and cooling said starch balls held by said net strainer with tap water;

transferring said starch balls to a dry container;

mixing said starch balls with a predetermined quantity of sugar;

storing said starch balls at room temperature; and serving said starch balls within a sixth predetermined span of time after thawing and cooking.

15. The method of claim 14, wherein said seventh predetermined temperature being at least 80 degrees Celsius.

16. The product of the method of claim 15 whereby said starch balls being taro starch balls.

17. The product of the method of claim 15 wherein said starch balls being sweet potato starch balls.

18. The product of the method of claim 15 wherein said starch balls being sticky rice starch balls.

19. The method of claim 1, wherein said starch balls taro starch balls.

20. The method of claim 1, wherein said starch balls being sweet potato starch balls.

21. The method of claim 1, wherein said starch balls being sticky rice starch balls.

22. A method of preparing dry tapioca starch balls for inclusion in drinks or food, comprising the steps of:

precooking the dry tapioca starch balls;

freezing said precooked tapioca starch balls;

thawing, cooking and preparing said frozen precooked tapioca starch balls for inclusion in said drinks or food.

23. The method of claim 22, wherein the method for precooking of dry said tapioca starch balls comprising the further steps of:

submerging dry tapioca starch balls into water held in a container;

cooking said tapioca starch balls for a span of time;

letting said mixture sit in said container for a span of time without adding any heat;

draining off said water; and rinsing and cooling said tapioca starch balls.

24. The method of claim 23, wherein the method for precooking said tapioca starch balls comprising the further steps of:

filling a container with a first predetermined amount of water at a first predetermined temperature;

submerging dry said tapioca starch balls into said water in said container;

stirring the submerged dry said tapioca starch balls to avoid clumping and sticking;

covering said container;

cooking said tapioca starch balls for a first predetermined span of time;

stopping said heating process;

uncovering said container;

stirring the mixture;

re-covering said container;

letting said mixture sit in the covered said container for a second predetermined span of time without adding any heat;

draining off said water by pouring said mixture through a net strainer;

rinsing and cooling said tapioca starch balls held by said net strainer with tap water; and transporting the precooked said tapioca starch balls to the freezing device.

25. The method of claim 24, wherein heating said water in said container to a temperature of 100 degrees Celsius prior to submerging dry said tapioca starch.

26. The method of claim 24, wherein said first predetermined span of time being at least twenty minutes.

27. The method of claim 24, wherein said second predetermined span of time being at least twenty minutes.

28. The method of claim 22, wherein the method for freezing the precooked said tapioca starch balls comprising the flirter steps of:

precooling the precooked said tapioca starch balls;

freezing said tapioca starch balls; and packaging the frozen said tapioca starch balls for shipment in a manner that maintains said tapioca starch balls in a frozen state.

29. The method of claim 28, wherein the method for freezing the precooked said tapioca starch balls comprising the further steps of:

pre-cooling the precooked said tapioca starch balls to a second predetermined temperature;

placing the pre-cooled precooked said tapioca starch balls into a cryogenic safe container;

placing said cryogenic safe container onto a cryogenic safe conveyor belt running through a tunnel in the freezer device;

spraying a cooling agent at a third predetermined temperature into said tunnel and around said cryogenic safe container to lower the air temperature in said tunnel to said fourth predetermined temperature;

conveying said container through said tunnel for a third predetermined span of time resulting in lowering the core temperature of said tapioca starch balls to at least a fifth predetermined temperature;

removing said container from said cryogenic safe conveyor;

packaging the frozen said tapioca starch balls for shipment in a manner that maintains a core temperature of said tapioca starch balls of at least a sixth predetermined temperature; and transporting the packaged said tapioca starch balls by a method that maintains a core temperature of said starch balls of at. least a sixth predetermined temperature.

30. The method of claim 29, wherein pre-cooling the precooked said tapioca starch balls to a temperature below 8 degrees Celsius.

31. The method of claim 29, wherein pre-cooling the precooked said tapioca starch balls with chilled water.

32. The method of claim 29, wherein said cryogenic safe container being fabricated from aluminum.

33. The method of claim 29, wherein said cryogenic safe container being fabricated from stainless steel.

34. The method of claim 29, wherein said third predetermined temperature being at or below −196 degrees Celsius.

35. The method of claim 29, wherein said cooling agent being liquid nitrogen.

36. The method of claim 29, wherein said fourth predetermined temperature being at −40 to −60 degrees Celsius.

37. The method of claim 29, wherein said third predetermined span of time for conveying said container through said tunnel being at least 7 minutes.

38. The method of claim 29, wherein said fifth predetermined temperature being at or below −20 Celsius.

39. The method of claim 29, wherein said sixth predetermined temperature being at or below −18 degrees Celsius.

40. The method of claim 29, wherein sizing and shaping said cryogenic safe container to produce an optimally shaped frozen block if precooked said tapioca starch balls, an optimal shape being a shape that will facilitate rapid and even microwave oven thawing.

41. The method of claim 40 wherein said optimally shaped frozen block of precooked said tapioca starch balls being about 16.0 cm×9.0 cm×2.0 cm.

42. The product of the method of claim 29 for freezing said tapioca starch balls.

43. The product of the method of claim 29 for freezing said tapioca starch balls, wherein:

pre-cooling the precooked said tapioca starch balls to a temperature below 8 degrees Celsius;

pre-cooling the precooked said tapioca starch balls with chilled water;

said third predetermined temperature being at or below −196 degrees Celsius;

said cooling agent being liquid nitrogen;

said fourth predetermined temperature being at −40 to −60 degrees Celsius;

said third predetermined span of time for conveying said container through said tunnel being at least 7 minutes;

said fifth predetermined temperature being at or below −20 Celsius;

said sixth predetermined temperature being at or below −18 degrees Celsius; and sizing and shaping said cryogenic safe container to produce an optimally shaped frozen block of precooked said tapioca starch balls, an optimal shape being a shape that will facilitate rapid and even microwave oven thawing.

44. The method of claim 22, wherein the method for thawing, cooking and preparing the frozen precooked said tapioca starch balls for consumption comprising the further steps of:

placing the frozen precooked said tapioca starch balls in a suitable microwave safe container;

submerging the frozen precooked said tapioca starch balls in water;

cooking the mixture for a span of time;

letting said mixture sit for a span of time; and draining off said water.

45. The method of claim 44, wherein the method for thawing, cooking and preparing the frozen precooked said tapioca starch balls for consumption comprising the further steps of:

placing the frozen precooked said starch balls in a suitable container;

submerging the frozen precooked said tapioca starch balls into a predetermined amount of water held at a seventh predetermined temperature;

cooking the mixture for a fourth predetermined span of time;

removing said suitable container from the heating process;

stirring said mixture;

covering said mixture in said suitable container with a lid;

letting said mixture sit in the covered said suitable container for a fifth predetermined span of time;

draining off said hot water by pouring said mixture through a net strainer;

rinsing and cooling said tapioca starch balls held by said net strainer with tap water;

transferring said tapioca starch balls to a dry container;

mixing said tapioca starch balls with a predetermined quantity of sugar to evenly coat each said starch ball and avoid clumping;

storing said tapioca starch balls at room temperature; and serving said tapioca starch balls within a sixth predetermined span of time after thawing and cooking.

46. The method of claim 45, wherein the quantity of said frozen precooked tapioca starch balls used being 300 grams.

47. The method of claim 45, wherein cooking said mixture in at least a 700 watt microwave oven at 100% cooking power, said microwave oven having a rotatable turntable, said suitable container being microwave safe, the quantity of said predetermined amount of water being at least three cups.

48. The method of claim 45, wherein said seventh predetermined temperature being at least 80 degrees Celsius.

49. The method of claim 45, wherein cooking said mixture on a stove top, wherein said seventh predetermined temperature being at least 80 degrees Celsius, cooking said mixture with at least 80% of maximum heat, said suitable container being stove top safe, the quantity of said predetermined amount of water being at least three cups.

50. The method of claim 45, wherein said fourth predetermined span of time being about four minutes.

51. The method of claim 45, wherein said fifth predetermined span of time being at least two minutes.

52. The method of claim 45, wherein said sugar being white sugar.

53. The method of claim 45, wherein said sugar being brown sugar.

54. The method of claim 45, wherein said sugar being powdered sugar.

55. The method of claim 45, wherein said sugar being liquid sugar.

56. The method of claim 45, wherein said sixth predetermined span of time being about six hours.

57. The product of the method of claim 45 for thawing and cooking said tapioca starch balls.

58. The product of the method of claim 45 for thawing and cooking said tapioca starch balls wherein:
the quantity of said frozen precooked tapioca starch balls used being 300 grams;
cooking said mixture in at least a 700 watt microwave oven at 100% cooking power;
said microwave oven having a rotatable turntable;
said suitable container being microwave safe;
the quantity of said predetermined amount of water being at least three cups;
said seventh predetermined temperature bein tag at least 80 degrees Celsius;
said fourth predetermined span of time being about four minutes; and
said fifth predetermined span of time being at least two minutes.

59. The product of the method of claim 45 for thawing and cooking said tapioca starch balls wherein:
the quantity of said frozen precooked tapioca starch balls used being 300 grams;
cooking said mixture on a stove top with at least 80% of maximum heat;
said suitable container being stove top safe;
the quantity of said predetermined amount of water being at least three cups;
said seventh predetermined temperature being at least 80 degrees Celsius;
said fourth predetermined span of time being about four minutes; and
said fifth predetermined span of time being at least two minutes.

60. The method of claim 22, wherein the method for thawing, cooking and preparing the frozen precooked said tapioca starch balls for consumption comprising the further steps of:
placing the frozen precooked said tapioca starch balls in a suitable microwave safe container;
submerging the frozen precooked said tapioca starch balls in water;
cooking the mixture for a span of time;
stifling said mixture;
cooking the mixture for another span of time; and
draining off said water.

61. The method of claim 60, wherein the method for thawing, cooking and preparing the frozen precooked said tapioca starch balls for consumption comprising the further steps of:
placing the frozen precooked said tapioca starch balls in a suitable container;
submerging the frozen precooked said tapioca starch balls into a predetermined amount of water held at a seventh predetermined temperature;
cooking the mixture for a fourth predetermined span of time;
removing said container from the heating process;
stirring said mixture;
covering said mixture in said suitable container with a lid;
cooking the mixture for a fifth predetermined span of time;
draining off said hot water by pouring said a mixture through a net strainer;
rinsing and cooling said tapioca starch balls held by said net strainer with tap water;
transferring said tapioca starch balls to a dry container;
mixing said tapioca starch balls with a predetermined quantity of sugar to evenly coat each said starch ball and avoid clumping;
storing said tapioca starch balls at room temperature; and
serving said tapioca starch balls within a sixth predetermined span of time after thawing and cooking.

62. The method of claim 61, wherein the quantity of said frozen precooked tapioca starch balls used being 300 grams.

63. The method of claim 61, wherein cooking said mixture in at least a 700 watt microwave oven at 100% cooking power, said microwave oven having a rotatable turntable, said suitable container being microwave safe, the quantity of said predetermined amount of water being at least three cups.

64. The method of claim 61, wherein said seventh predetermined temperature being at least 80 degrees Celsius.

65. The method of claim 61, wherein cooking said mixture on a stove top, wherein said seventh predetermined temperature being at least 80 degrees Celsius, cooking said mixture with at least 80% of maximum heats said suitable container being stove top safe, the quantity of said predetermined amount of water being at least three cups.

66. The method of claim 61, wherein said fourth predetermined span of time being at least one minute.

67. The method of claim 61, wherein said fifth predetermined span of time being at least one minute.

68. The method of claim 61, wherein said sugar being white sugar.

69. The method of claim 61, wherein said sugar being brown sugar.

70. The method of claim 61, wherein said sugar being powder sugar.

71. The method of claim 61, wherein said sugar being liquid sugar.

72. The method of claim 61, wherein said sixth predetermined span of time being about six hours.

73. The product of the method of claim 24 for precooking said tapioca starch balls.

74. The product of the method of claim 24 for precooking said tapioca starch balls, wherein:
heating said water in said container to at least 80 degrees Celsius prior to submerging dry
said tapioca starch;

said first predetermined span of time being at least twenty minutes; and said second predetermined span of time being at least twenty minutes.

75. The product of the method of claim 61 for thawing and cooking said tapioca starch balls.

76. The product of the method of claim 61 for thawing and cooking said tapioca starch balls wherein;

the quantity of said frozen precooked tapioca starch balls used being 300 grams;

cooking said mixture in at least a 700 watt microwave oven at 100% cooking power;

said microwave oven having a rotatable turntable;

said suitable container being microwave safe;

the quantity of said predetermined amount of water being at least three cups;

said seventh predetermined temperature being at least 80 degrees Celsius;

said fourth predetermined span of time being at least one minute; and said fifth predetermined span of time being at least one minute.

77. The product of the method of claim 61 for thawing and cooking said tapioca starch balls wherein:

the quantity of said frozen precooked tapioca starch balls used being 300 grams;

said seventh predetermined temperature being at least 80 degrees Celsius;

cooking said mixture on a stove top with at least 80% of maximum heat;

said suitable container being stove top safe;

the quantity of said predetermined amount of water being at least three cups;

said seventh predetermined temperature being at least 80 degrees Celsius;

said fourth predetermined span of time being at least one minute; and said fifth predetermined span of time being at least one minute.

* * * * *

UNITED STATES PATENT AND TRADEMARK OFFICE
CERTIFICATE OF CORRECTION

PATENT NO.    : 6,455,091 B1  
DATED         : September 24, 2002  
INVENTOR(S)   : Patrick Po-Yung Ling and Janie Houy-Jen Lai It is certified that error appears in the above-identified patent and that said Letters Patent is hereby corrected as shown below:

<u>Column 7,</u>
Line 67, should read:
-- Said starch balls for inclusion in said drinks or food. --

Signed and Sealed this

Fifteenth Day of April, 2003

JAMES E. ROGAN
*Director of the United States Patent and Trademark Office*